United States Patent [19]

Sawada et al.

[11] 4,015,019

[45] Mar. 29, 1977

[54] PREPARATION OF FOAMING SOYBEAN PRODUCTS AND THE PRODUCTS THEREFROM

[75] Inventors: Koshichi Sawada, Suita; Masahiro Kajikawa, Kawanishi; Koichi Kotani, Sakai, all of Japan

[73] Assignee: Takeda Chemical Industries, Ltd., Osaka, Japan

[22] Filed: Apr. 1, 1975

[21] Appl. No.: 564,210

[30] Foreign Application Priority Data

Apr. 3, 1974 Japan .............................. 49-38339

[52] U.S. Cl. .................................. 426/46; 426/52; 426/656
[51] Int. Cl.² .......................................... C12B 1/00
[58] Field of Search .................. 426/44, 49, 52, 46, 426/564, 598, 656, 658, 659, 660

[56] References Cited

UNITED STATES PATENTS

| 2,489,208 | 11/1949 | Turner | 426/46 |
| 3,639,129 | 2/1972 | Mustakas et al. | 426/598 |

*Primary Examiner*—R. B. Penland
*Attorney, Agent, or Firm*—Wenderoth, Lind & Ponack

[57] ABSTRACT

Foaming soybean products useful in food industries can be prepared through series of steps (1) subjecting soybean materials to enzymatic partial hydrolysis without application of any treatment for removing soybean whey component, (2) heating the hydrolyzed product for a short time to inactivate the enzyme, (3) cooling the heated product at neutral or weakly acid pH, (4) removing the precipitates formed, and (5) concentrating the resultant solution followed by pulverization. The product is producible in a high yield from soybean meal with less industrial wastes to be disposed, and has good foaming property.

5 Claims, No Drawings

PREPARATION OF FOAMING SOYBEAN PRODUCTS AND THE PRODUCTS THEREFROM

This invention relates to foaming soybean products and the production thereof. More particularly, this invention relates to the foaming soybean products which are prepared from soybean materials through a process without applying any step for removing soybean whey component and have good foaming property in food industries.

The foaming products or foaming agents in food industries are particularly adapted for use in food industries, i.e. the preparation of such foods as frappe, nougats, fudge, cream candies, meringue and the like.

Generally speaking, among may kinds of the foaming products used in the food processing field, the foaming products which are made from animal proteins such as hen's egg, egg white and cow's milk etc. have good quality and foaming property.

But, the said foaming products made from animal protein have a strong tendency toward fluctuations in price or higher price based on the alteration of the relationship between a demand and a supply of animal protein materials.

From the circumstances, it has been noticed to utilize soybean protein which is rather cheap and has relatively small fluctuations in price, and many methods of preparation of foaming products by subjecting soybean protein to enzymatic partial hydrolysis with proteolytic enzymes have been reported.

The hitherto reported processes all include indispensably a step of removing soybean whey components and hence the product of such processes do not contain soybean whey component which has been regarded as an undesirable component against foaming property of the product. In fact, if these known processes are carried out without applying the step for removing soybean whey component, the foaming property of the product obtained thereby is remarkably lessened.

On the other hand, soybean whey component occupies about one third of the total weight of defatted soybean material so that all the known processes by-produce huge volume of industrial wastes to be disposed.

Under such circumstances, the present inventors made their search investigating a process for preparing foaming soybean product from soybean material without applying any step of removing soybean whey component not only to reduce the volume of industrial wastes but also to heighten the yield of the product.

After through investigation, the present inventors found a new process for preparing foaming soybean products which comprises no step for removing soybean whey component, from soybean materials. In other words, in such new process, soybean whey component, having been disposed as an industrial wastes, is all utilized as ingredients of the foaming soybean products intended. Moreover, it was found that the product of the new process is not inferior to the hitherto known products, prepared through step of removing soybean whey component from soybean materials, in its foaming property.

Thus, the princpal object of this invention is to provide a process for preparing, without applying the removing step of soybean whey component, foaming soybean products from soybean material.

Another object is to provide new foaming soybean products prepared through the new process.

These and other objects will be able to understand clearly from the description and claims disclosed hereunder.

In the process of this invention, soybean materials which contain whey component as well as soybean protein are employed as the starting material. As such soybean material, there may be exemplified whole soybean, decoated soybean, ground soybean, soybean flakes, coarsely ground soybean, defatted soybean and so on. These may conveniently be used in powdery form or in flake form. Among them, it is specifically recommendable to use defatted soybean flour or defatted soybean flake which is readily subjected to enzymatic hydrolysis treatment.

The first step of the process of this invention is an enzymatic partial hydrolysis of such soybean material as above recited. The enzymatic partial hydrolysis is carried out advantageously in an aqueous dispersion, suspension or solution. A water proportion of which being about 5 to 50 times the amount (weight) of the soybean material, preferably about 10 to 20 times on the same basis.

The pH and temperature of the mixture are adjusted to the optimum levels according to the properties possessed by the proteolytic enzyme to be added.

The acid or alkali to be employed in pH adjustment may be exemplified by hydrochloric acid, sulfuric acid, phosphoric acid, acetic acid, sodium hydroxide, sodium sulfite, sodium carbonate and so on.

As the aforementioned proteolytic enzyme, acid, neutral or alkaline protease may be used, and it may be of the vegetable, animal or microbial origin. For example, pepsin, papain, acid protease obtained by the cultivation of the microorganism belonging to the family, Polyporacease, for example *Trametes sanguinea* (L. ex Fr.) Llord, *Trametes cinnabarino* (jacq.) Fr., *Poria vaporaria* (Fr. non Pers.) Cooke, etc. may be used. The proteolytic enzyme is added to the aqueous dispersion, suspension or solution and the enzymatic hydrolysis may preferably be carried out under optimal pH and temperature in accordance with the proteolytic enzyme used with conventlonal manner until the partially hydrolyzed product has attained an analytical value of 0.4 to 0.7, preferably of 0.5 to 0.6.

Hereinafter, the method of computing the analytical value showing the progress of enzymatic hydrolysis is described.

THE METHOD OF COMPUTING THE ANALYTICAL VALUE

The partially hydrolyzed product to be assayed, which has been derived from the soybean material, is heated and, after the internal temperature has reached 90° C, the heated product is maintained at that temperature for 3 minutes. Then, the heated product is cooled to room temperature (about 20° C) and, then, diluted with water so that the nitrogen content of the system will be 0.1 weight percent. Then, to 2 ml. of the resulting dilution is added 8 ml. of a protein precipitant (a mixture of 0.05M trichloroacetic acid, 0.10M sodium acetate and 0.10M acetic acid) and while the system is maintained at 30° C, it is allowed to stand for 30 minutes. The mixture is filtered and 5 ml. of 0.5M sodium carbonate and 1 ml. of a 2 fold dilution of phenol reagent (Folin's reagent) (The procedure for preparation of the phenol reagent is described in the J. Biol. Chem. 73 629 (1927)) to 2 ml. of the filtrate.

The system is allowed to stand at 30° C for 30 minutes and its absorbance at 660 m$\mu$ is measured.

As a control, the enzymatically untreated product derived from the same soybean material as used in the above was also treated in the same manner as above and its absorbance at 660 m$\mu$ is measured. The value found is substracted from the absorbance value of the enzymatically treated system and the balance is taken as the analytical value of the enzymatically hydrolyzed product.

It should be mentioned that among the afore-recited proteolytic enzymes, acid proteases, in particular, have the advantages that the resulting product is of superior quality and that spoilage in the production process may be inhibited. Since pepsin is generally one of the most common acid proteases, the application of this enzyme will be described in detail. And, in case of using other acid proteases, the hydrolysis may similarly be carried out by modifying the method of using pepsin being described below while taking into consideration the properties of the acid protease used, i.e. optimal pH and temperature and so on. Namely, for example, about ten times the weight of defatted soybean flour of water is added and the mixture is stirred evenly to prepare a suspension of soybean flour.

In carrying out this operation, the temperature of the system is preferably in the range of 30° to 70° C and, for still better results, about 35° to 60° C. The pH of the system is preferably in the range of pH about 1.5 to 3.5, preferably pH about 2 to 3. Then, pepsin with a protease activity of 100 thousand units/g. (The protease activity is a value determined by the modified Anson-Hagiwara's method, which is described in Kosa Kenkyu Ho (method for Enzyme Studies) II, edited by Shiro Akabori et al., published by Kabushiki Kaisha Asakura-shoten (1956) P 240, and this method is in detail described hereinafter; the same definition applies hereinafter) is added to the above soybean flour suspension in a proportion of about 0.1 to 1 weight percent, preferably about 0.5 weight percent based on the weight of proteins contained in the soybean flour suspension, and the enzymatic hydrolysis is carried out for about 30 minutes to 30 hours, preferably for about 1 to 20 hours while the system is maintained at the aforementioned temperature.

PROCEDURE OF THE MODIFIED ANSON-HAGIWARA'S METHOD FOR DETERMINATION OF PROTEASE ACTIVITY

1. To a 30 ml. test tube is transferred 1 ml. of a solution (previously warmed at about 30° C) containing the enzyme whose protease activity is to be determined, to which is added 5 ml. of a 0.6 % aqueous solution of a commercially available high quality casein. The test tube is placed in a thermostat at 30° C, then, after exactly 10 minutes, 5 ml. of a precipitation reagent which is an aqueous solution containing 0.11M COl$_3$-COOH, 0.22M CH$_3$COONa and 0.33M CH$_3$COOH is added. After about 30 minutes incubation, the medium in the test tube is filtered by using hardened filter paper having about 6 cm. in diameter set on a funnel having about 3 cm. in diameter over a 15 ml. test tube to obtain a filtrate (I).

2. Two ml. of the said filtrate (I) is transferred to a 20 ml. test tube to which is added 5 ml. of 0.55M Na$_2$CO$_3$. To the test tube is added 1 ml. of a reagent solution prepared by diluting Folin's reagent with three times of its volume of water, followed by immediate agitation. Then the medium is left standing at 30° C for 30 minutes to obtain an incubate (II).

3. Optical density of the incubate (II) thus obtained is measured at 660 m$\mu$ in 1 cm. light pass. The optical density of the enzyme whose protease activity is to be determined is expressed by deducting optical density of the blank from that of the incubate (II). The protease activity is expressed by the term "unit", whose value is obtained referring to the standard curve drawn by plotting values of a known protease activities at given concentrations.

The enzymatic hydrolysis is terminated when the hydrolyzed product has attained an analytical value of 0.4 to 0.7, preferably 0.5 to 0.6. If the analytical value is out of this range, there may possibly be expected some disadvantageous results. Namely, when the analytical value is less than 0.4, the resulting product does not necessarily display adequate foam expansion and, because of the increased amounts of insolubles that are separated and removed, the product yield is sacrificed to some extent. On the other hand, when the analytical value is higher than 0.7, the resulting product is generally inferior in the shelf life of foam and in most cases has a bitter taste. (cf. Experiment 3 hereinafter).

The partially hydrolyzed product thus obtained is further subjected to a combination treatment of (A) heating at an elevated temperature for a short time, (B) cooling and, if necessary, (C) pH adjustment, whereby a product whose temperature is not higher than 60° C with a pH value of 5 to 7 is prepared.

The aforementioned heating at an elevated temperature for a short time means an operation that the partially hydrolyzed product is heated and, after the product has attained a temperature of about 90° C, it is maintained at this temperature for about 1 to 10 minutes, preferably for 3 to 5 minutes. The aforementioned cooling is an operation in which the heated product is cooled to an internal temperature of not more than 60° C, preferably between room temperature and 60° C.

The aforementioned pH adjustment is an operation to be conducted upon necessity, whereby pH of the product is brought to 5–7. This pH adjustment may be carried out, if necessary, at any stage during the step in which the partially hydrolyzed product is subjected to the combination treatment which may be carried out either before or after the heat treatment, or either before or after the cooling step.

If, however, the partial hydrolyzate has a pH value within such a range, this step is naturally unnecessary.

Temperature adjustment may be carried out in the routine manner. Thus, for example, the treatment may be carried out at the desired temperature for the desired duration in an autoclave fitted with a jacket. Alternatively, the temperature adjustment may be carried out by passing, through a serpentine tubing, a suitable heating medium such as high-temperature steam or a suitable cooling medium such as water and the like.

Moreover, the combination treatment may include a procedure of removing insolubles which may occur in the system. That is, heating or cooling process of the partial hydrolyzate generally causes insolubles which are preferably removed in the course of the combination treatment at the optional stage on necessity. To explain more concretely, an example of the incorporation of such removing treatment into the combination treatment will be disclosed hereunder.

A preliminary (first) separation step may be applied to cooled product obtained by cooling treatment, at the internal temperature of not higher than 60° C, preferably at a temperature between room temperature and 60° C to remove insolubles. The supernatant fluid thus prepared is heated at a temperature of not less than about 70° C, preferably about 80° to 95° C, for not more than about 30 minutes, preferably about 10 to 20 minutes and, thereafter, the fluid is cooled to an internal temperature of not higher than 60° C, preferably from room temperature to 60° C. Then, the cooled product is subjected to principal (second) separation step. When such a first and second separation procedures are followed, pH adjustment may be carried out, if required, at any stage of this combination treatment including the case in which the pH adjustment is carried out before or/and after the preliminary (first) separation procedure. Thus, the partially hydrolyzed product is changed into a conditioned preparation with a pH value of 5 to 7 and an internal temperature of not higher than 60° C, preferably from room temperature to 60° C, at a stage prior to finally securing the aforementioned filtrate by removal of insolubles. And a further improvement in product quality can be accomplished by carrying out these first and second separation procedures (cf. Examples hereinafter).

As for the procedure for removing the insolubles and thereby attaining a filtrate, one may employ one of the routine procedures, for example, a centrifugal separator of the decanter type, a filter press with the addition of a suitable filter aid if required. As the filter aid, if used, there may, for example, be diatomaceous earth etc.

Then, the filtrate obtained as above is concentrated and/or dried in a conventional manner to obtain the desired soybean product.

In this connection, the filtrate may be directly dried up when the proportion of solids in the filtrate is high, but when this proportion is not so high, it is, in view of economical preparation, advantageous to concentrate the filtrate by a suitable procedure to a solids content of about 20 to 30 percent and, then, dry up the concentrate. Generally, compared with the process that the filtrate is directly dried up, such a two-step process leads to the resulting product which is excellent in the odor and the dispersibility thereof in water. The concentration is desirably carried out at an internal temperature not exceeding about 70° C, preferably between room temperature and about 60° C, and under reduced pressure. In case the concentration is carried out at atmospheric pressure, it is desirable to complete the operation in as short a time as practicable.

The drying operation may be performed by a conventional procedure, for example by spray drying or drum drying.

Generally, however, spray drying is carried out using a spray dryer of the nozzle type or of the disc type, care being taken to ensure that the temperature of air current at the inlet will not be excessively high.

Table I below shows the difference between the conventional processes (I) and (II) and the process according to this invention.

Table 1

Conventional processes (I) (II)

(Modified process of that (Modified process of that

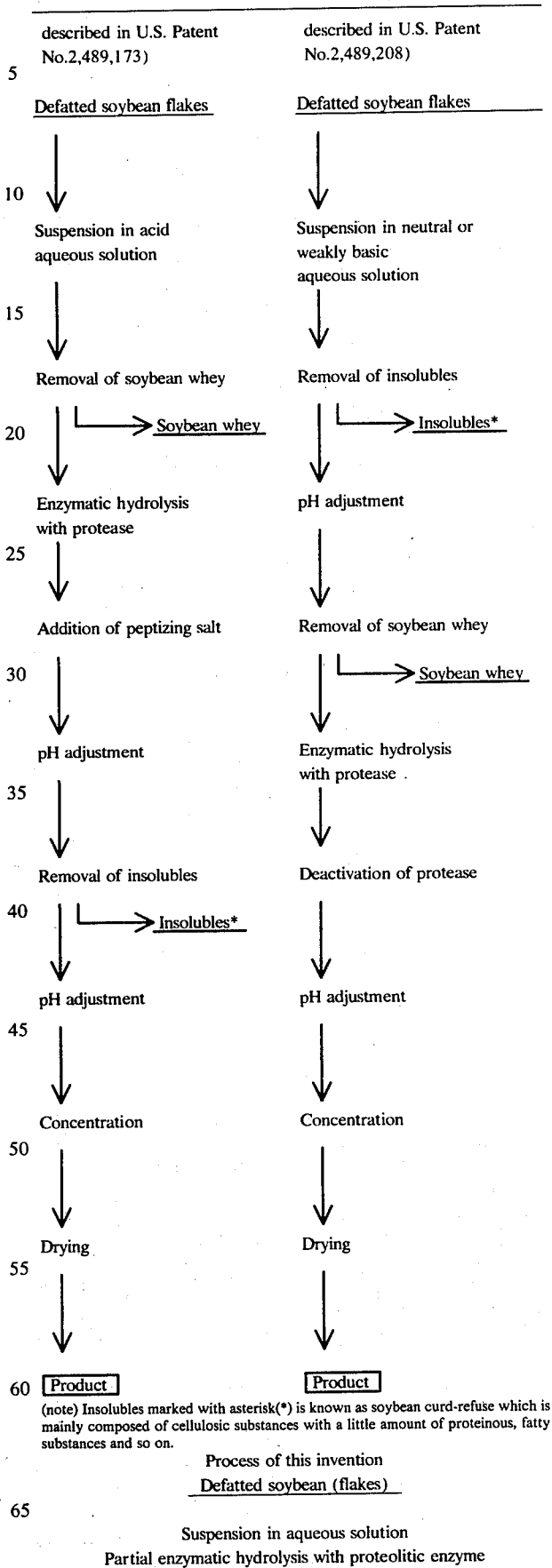

(note) Insolubles marked with asterisk(*) is known as soybean curd-refuse which is mainly composed of cellulosic substances with a little amount of proteinous, fatty substances and so on.

Table 1-continued

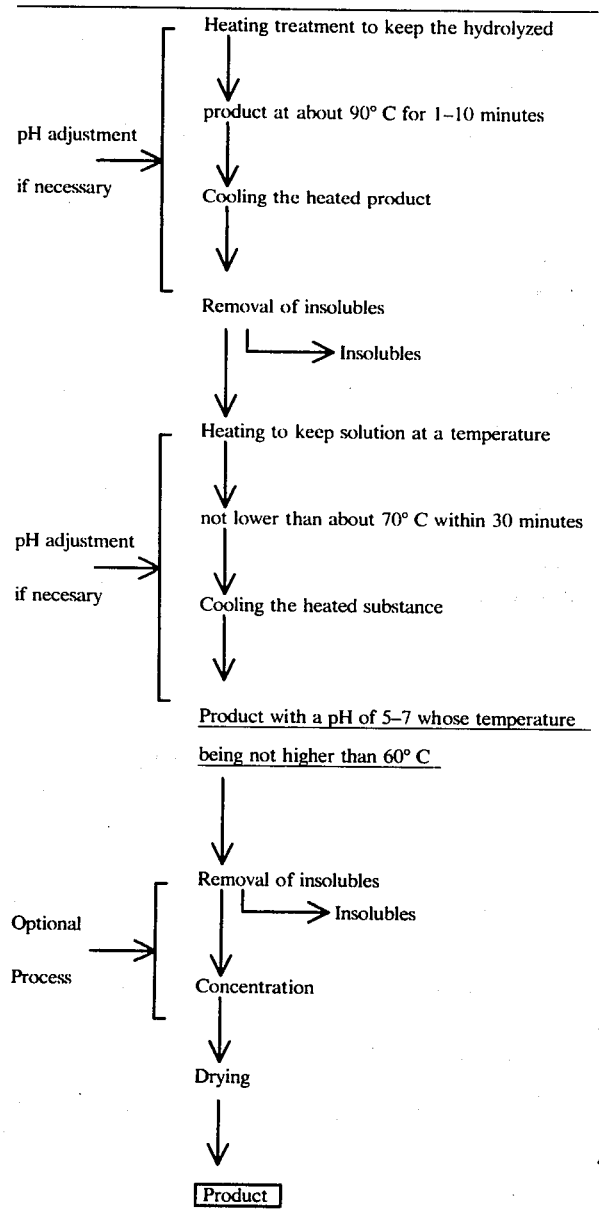

The foaming soybean products of this invention contain as high as about 30 weight % of soybean whey component relative to the whole quantity. Compared with the product of the present invention, the products obtainable by a conventional process contains about 3 weight % of soybean whey component relative to the total quantity.

And the product of this invention has an exccellent flavor, and has an excellent foaming property, giving rise to an unusually delicate satisfactory foam which is long-sustained.

The following experimental data and working examples are further illustrative of this invention.

REFERENCE EXAMPLE 1

(conventional method)

The conventional processes for producing a foaming agent based on soybean protein invariably involve an extractive removal of the soybean whey component prior to an enzymatic hydrolysis. The following is an example.

I. Preparation of prior-art product I(control product) by a process modified from that described in U.S. Pat. No. 2,489,173

To 90 kg. of water was added 550 g. of concentrated hydrochloric acid, followed by the addition of 10 kg. of defatted soybean flour. After the system was adjusted to pH 4.5, it was gently stirred at room temperature for about 1 hour to extract the acid-soluble fraction contained in the soybean material. Then, the system was centrifuged to remove the soybean whey component and the supernatant fluid was discarded. To the residue was added 70 kg. of water and, after stirring for 30 minutes, the mixture was centrifuged. The supernatant fluid was discarded. To 43 kg. of the residue thus obtained was added 35 kg. of lukewarm water (40° C) to evenly disperse the same. The system was adjusted to pH 2 with concentrated hydrochloric acid, its temperature being brought to 40° C. 16 g. of pepsin with a protease activity of 100,000 units/g. was dissolved in a small amount of water and the resulting solution was added to the above system. While the above internal temperature was maintained, the system was gently stirred to carry out the enzymatic hydrolysis, for 20 hours. In the enzymatically hydrolyzed product thus obtained was dissolved 150 g. of sodium chloride and, then, the pH of the mixture was brought to 3.5 by gradual addition of aqueous sodium hydroxide. The mixture was left standing for a while, after which the insolubles in the slurry were removed by centriguation. Using a vacuum concentrator, the filtrate thus obtained was concentrated at an internal temperature of 60° C to recover 14 kg. of a concentrate with a solids content of about 20%. This concentrate was then spray-dried with a spray dryer of the disc type. The procedure yielded 2.7 kg. of a soybean product (hereinafter referred to as "prior-art product I"), as white powder with a moisture content of 5.8%.

II. Preparation of prior-art product II(control product) by the modified process of that described in U.S. Pat. No. 2,498,208

In 100 kg. of lukewarm water was dissolved 170 g. of sodium sulfite, followed by addition of 10 kg. of the same extracted soybean flour as that used in the preparation of prior-art product I above.

While the mixture was maintained at an internal temperature of about 50° C, it was gently stirred for about 1 hour, after which the insolubles were removed by centrifugation. The resulting aqueous extract was adjusted to pH 4.5 with 10% hydrochloric acid to coagulate and precipitate the soybean protein curd. The soluble fraction was then removed by centrifugation to remove the soybean whey component. To 7.5 kg. of thus-obtained soybean protein curd were added sufficient quantities of lukewarm water and concentrated hydrochloric acid to prepare a slurry with a solids content of 5 weight %, pH 2 and an internal temperature of 40° C. Separately, 10 g. of pepsin (protease activity 100,000 units/g.) was dissolved in a small amount of water. The pepsin solution thus obtained was added to the above slurry and the enzymatic hydrolysis was carried out for 4 hours, with gentle stirring and while the above internal temperature was maintained.

Then, the enzymtically hydrolyzed product was heated to an internal temperature of 75° C, at which level it was maintained for 30 minutes. After cooling to room temperature, an aqueous solution of sodium hydroxide (30% concentration) was gradually added under stirring until the pH became 6.5. The slurry was then spray-dried to recover 2.5 kg. of a soybean product (hereinafter referred to as "prior-art product II") as white powder with a moisture content of 5.7%.

EXPERIMENT 1

1. Testing Procedure

Production of foaming soybean product samples (1)

To 2.5 kg. of defatted soybean flour was added 10 kg. of lukewarm water (about 40° C) and, after stirring to homogeniety, the mixture was adjusted to pH 2 with concentrated hydrochloric acid and an internal temperature of about 40° C.

Then, a solution of 5 g. of pepsin (protease activity 100,000 units/g.) in a small amount of water was added to the above mixture. The enzymatic hydrolysis was carried out for 5 hours, with gentle stirring and while the above internal temperature was maintained. The procedure yielded a partially hydrolyzed product with an analytical value of 0.54.

The hydrolyzed product thus obtained was divided into five aliquot portions and each portion was heated and cooled under the conditions set forth below in the table II. Then, each processed soybean product was adjusted to pH 5 by gradual addition of an aqueous solution of sodium hydroxide and centrifuged to remove the isolubles. The filtrate was concentrated at an internal temperature of 60° C with a vacuum concentrator to obtain a concentrate with a solids content of about 20%. The concentrate was spray-dried to obtain a foaming soybean product sample (1). A test for foaming property and a test for flavor of the foam formed were performed on samples prepared in the above manner.

Procedure of test (1) for foaming property
Test for foam expansion

In an aqueous solution containing 50% (by weight) of sucrose, 1% of citric acid and 0.15% of sodium citrate was dissolved 4% of each soybean product sample. A 50 ml. portion of the mixture was taken and stirred with an electric whipping apparatus for 30 seconds. The volume (ml.) of the resulting foam was measured and foam expansion of the sample is judged from the value of the foam volumes.

Test for foam stability

Then, the foam was placed on a hopper-shaped wire netting with 1 mm opening which is made of vinylidene chloride-vinyl chloride copolymer fiber and allowed to stand there for 30 minutes.

The volume (ml.) of an aqueous solution that has separated from the foam was measured and its foam stability was judged from the value of the volume of the aqueous solution. And flavor of the foam was judged from flavors of the aqueous solution.

Thus, from the results of the foam expansion and the foam stability, using a panel of 10 experts, the foaming property of each sample was assessed by the 1–4-point scoring method (The higher the score, the better are the score, the better are the foaming property).

Then, in addition to the foaming property, the flavor of the foam, the deliciousness or other properties of the foam were also evaluated as an integral quality, and ranking of the samples was made.

2. Test Results

The test results are set forth below in the table II. It was clearly demonstrated that a soybean produced with an excellent flavor and excellent foaming property can be obtained by subjecting the enzymatically hydrolyzed product to a heating at an internal temperature of 90° C for 1–10 minutes and a subsequent cooling to 30° C.

Table II

| No. | Properties Heating and cooling conditions | Evaluation of foaming property | Flavor of separated aqueous solution | Ranking |
|---|---|---|---|---|
| 1 | Untreated | 2.0 (Inferior) | Bitter taste | 5 |
| 2 | Heating at 90° C for 1 minute; then, rapid cooling to 30° C | 3.3 (Superior) | Good | 2 |
| 3 | Heating at 90° C for 3 minutes; then, rapid cooling to 30° C | 3.4 (Superior) | Good | 1 |
| 4 | Heating at 90° C for 10 minutes; then, rapid cooling to 30° C | 3.2 (Superior) | Good | 2 |
| 5 | Heating at 90° C for 30 minutes; then, rapid cooling to 30° C | 2.4 (Inferior) | Good | 4 |

EXPERIMENT 2

1. Testing Procedure

Production of foaming soybean product samples (2)

By a procedure similar to that described in Experiment 1, defatted soybean flour was subjected to enzymatic hydrolysis using pepsin (100,000 units/g.) to obtain an enzymatically hydrolyzed product with an analytical value of 0.53. This hydrolyzed product was heated to 90° C and maintained at the same temperature for 3 minutes. Then, it was cooled to room temperature (about 20° C). The cooled product was divided into equal portions and each aliquot was adjusted to the pH indicated in the following table and centrifuged to remove the insolubles. Using a vacuum concentrator, each supernatant fluid was concentrated at an internal temperature of 60° C, whereby a concentrate with a solids content of about 20% was obtained. The concentrate was spray-dried to recover a foaming soybean product sample (2) and a test for foaming property and a test for condition and flavor of the foam formed from the sample were carried out on the sample by the testing procedures set forth in Experiment 1.

2. Test Results

The test results are shown below in the table III. It has been clearly demonstrated that a product with significantly superior flavor, the foaming property, and condition of the foam can be obtained by first preparing a slurry with a pH value of 5 to 7 then, removing the undesirable factors occurring in minor proportions in the soybean whey component and protein hydrolysate practically as the insolubles are removed by filtration.

Table III

| | Properties | | | | |
|---|---|---|---|---|---|
| No. | pH adjustment | Evaluation of foaming property | Condition of foam | Flavor of separated aqueous solution | Integral evaluation |
| 1 | 3.5 | 2.0 | Coarse and inferior | A conspicuously bitter taste, inferior | Inferior |
| 2 | 4.5 | 2.5 | Coarse and inferior | A conspicuously bitter taste, inferior | Inferior |
| 3 | 5.0 | 3.5 | Delicate and superior | Superior | Superior |
| 4 | 5.5 | 3.5 | Delicate and superior | Superior | Superior |
| 5 | 6.0 | 3.5 | Delicate and superior | Superior | Superior |
| 6 | 7.0 | 3.2 | Delicate and superior | Superior | Superior |
| 7 | 8.0 | 2.5 | Coarse and inferior | A conspicuously stoggy taste, inferior | Inferior |

EXPERIMENT 3

Testing Procedure

Production of foaming soybean product samples (3)

To 4 kg. of extracted-soybean flour was added 40 kg. of lukewarm water (about 40° C) and, after stirring to homogeniety, the mixture was adjusted to pH 2 with concentrated hydrochloric acid, the internal temperature of the mixture being brought to 37° C. The mixture was divided into 8 equal portions and each portion was subjected to the enzymatic hydrolysis using pepsin (100,000 units/g.) until it had shown the analytical value indicated below in the table IV. Each portion was heated to an internal temperature of 90° C, after which it was maintained at the same temperature for 3 minutes, followed by cooling to room temperature (about 20° C). Then, while each hydrolyzed product was stirred, it was adjusted to pH 5.5 by the gradual addition of an aqueous solution of sodium hydroxide. The slurry was centrifuged to remove the insolubles and the resulting filrate was concentrated at an internal temperature of 60° C with a vacuum concentrator. The resulting concentrate with a solid content of 20% was spray-dried to obtain a foaming soybean product sample (3).

Test for foaming property

On thus-obtained soybean product samples, a comparative test for foaming property was conducted using a panel of 10 experts by the 1–4-point scoring method described in Experiment 1. (The higher the score, the better are the foaming characteristics).

TEST RESULTS

The test results are set forth below in the table IV. It has been clearly demonstrated that an improved result can be obtained by carrying out the enzymatic hydrolysis until analytical value of 0.4 to 0.7.

When the analytical value was lower than 0.4, there was realized only an inadequate foam expansion, while a coarse, less stable foam with a bitter taste was obtained when the analytical value was above 0.7.

Table IV

| Properties Sample | Analytical value | Foaming property |
|---|---|---|
| 1 | 0.30 | 2.0 |
| 2 | 0.36 | 2.0 |
| 3 | 0.40 | 3.1 |
| 4 | 0.50 | 3.5 |
| 5 | 0.55 | 3.5 |
| 6 | 0.60 | 3.4 |
| 7 | 0.70 | 3.0 |
| 8 | 0.75 | 2.0 |

EXAMPLE 1

90 kg. of lukewarm water (about 40° C) was added to 10 kg. of the same defatted soybean flour as that used in Reference Example 1 and, after stirring to homogeniety, the mixture was adjusted to pH about 2 with concentrated hydrochloric acid, the temperature of the mixture being brought to about 40° C. To this mixture was added a solution of 18 g. of pepsin (protease activity: 100,000 units/g.) in a small quantity of water and while the system was gently stirred at the above internal temperature for 4 hours. By this enzymatic hydrolysis was obtained an enzymatically hydrolyzed product which showed an analytical value of 0.53. This slurry was heated to an internal temperature of 90° C, at which level it was maintained for 3 minutes, followed by cooling to room temperature. The cooled slurry was adjusted to pH 5 by the gradual addition of aqueous sodium hydroxide (30% concentration) with stirring and, then, the thus obtained conditioned preparation with pH 5 was allowed to stand for a while. It was then centrifuged to remove the insolubles and 75 kg. of the resulting supernatant fluid was concentrated at an internal temperature of 60° C with a vacuum concentrator to obtain 32 kg. of a concentrate with a solids content of about 20%. This concentrate was spray-dried to recover 6.3 kg. of a soybean product (hereinafter referred to as "product A of this invention") as a white powder having a moisture content of 5.6%.

A conditioned preparation with pH 5 which was obtained by subjecting soybean to an enzymatic hydrolysis, heating, cooling, pH adjustment and other procedure similar to the foregoing was centrifuged (preliminary separation) to obtain 75 kg. of a supernatant fluid I and II are set forth below in the table V. The results show that compared with the prior-art products, any of the products A, B and C of this invention contains about 10 times as much soluble nitrogen-free substance (mostly carbohydrates) which is a principal ingredient of soybean whey component. And the products A, B and C of this invention contain about 1.5 time as much crude protein as soluble nitrogen-free substance on the weight basis. On the contrary, the prior-art products I and II contain about 5 times as much crude protein as soluble nitrogen-free substance.

Table V

| Sample<br>Item | Product A of this<br>invention | Product B of this<br>invention | Product C of this<br>invention | Prior-art<br>product I<br>(control) | Prior-art<br>product II<br>(control) |
| --- | --- | --- | --- | --- | --- |
| Weight loss on drying | 5.6 | 5.7 | 5.6 | 5.8 | 5.7 |
| Crude protein | 46.2 | 46.9 | 47.3 | 76.1 | 74.3 |
| Crude fat | Trace | Trace | Trace | Trace | Trace |
| Crude fiber | 0 | 0 | 0 | 0 | 0 |
| Crude ashes | 17.4 | 16.5 | 15.5 | 15.0 | 16.0 |
| Soluble nitrogen-free substance | 30.8 | 30.9 | 31.4 | 3.1 | 3.0 |

(Note)
1. Figures in the table are weight percents.
2. In the table, soluble nitrogen-free substance is mostly comprised of carbohydrates and accounts for about 90 weight % of soybean whey component.

(pH 5). This supernatant fluid was heated again to 90° C, maintained at the same temperature for 10 minutes and cooled to 50° C. The insolubles were then removed by centrifugation (second separation). The resulting supernatant fluid was concentrated at an internal temperature of 60° C with a vacuum concentrator to obtain 32 kg. of a concentrate with a solids content of about 20%. This concentrate was spray-dried to recover 6.1 kg. of a soybean product (hereinafter referred to as "product B of this invention") as a white powder showing a moisture content of 5.7%.

An enzymatically hydrolyzed product of pH 2, prepared in the same manner as above, was similarly heated, cooled and centrifuged (preliminary separation) to obtain 75 kg. of a supernatant fluid (pH 2). The supernatant fluid was adjusted to pH 5.5 by the gradual addition of aqueous sodium hydroxide (30% concentration) with stirring.

This fluid was heated again to 90° C, maintained at the same temperature for 10 minutes and cooled to 50° C. The insolubles were removed by centrifugation (second separation) and the resulting supernatant fluid was concentrated at an internal temperature of 60° C with a vacuum concentrator to obtain 32 kg. of a concentrate with a solids content of about 20%. This concentrate was spray-dried to recover 6.0 kg. of a soybean product (hereinafter referred to as "product C of this invention") as a white powder having a moisture content of 5.6%.

ANALYTICAL RESULT ON PRODUCTS A, B AND C OF THIS INVENTION AND PRIOR-ART PRODUCTS I AND II

Analytical results of the above-mentioned products A, B and C of this invention and the prior-art products

COMPARISON AS TO FOAMING PROPERTIES

The foaming properties of the products A, B and C of this invention and the prior-art products I and II were compared by the following test.

PROCEDURE OF THE TEST (2) FOR FOAMING PROPERTY

Tests were carried out on soybean systems containing water alone, an aqueous solution of sucrose, an oil and wheat flour, respectively.

Thus, in each of water, a 30% aqueous solution of sucrose, an aqueous solution of 30% sucrose and 8% of an edible oil, and an aqueous solution of 40% sucrose and 15% flour, there was incorporated and dissolved one of the test products to a concentration of 4%.

A 50 ml. portion of each solution was taken and whipped by means of an electric whipping apparatus for 5 minutes.

The volume (ml.) of the resulting foam was measured, which shows foam expansion of each test product.

Then, the foam was placed on a hopper-shapd wire netting with 1 m.m. opening which was made of vinyliden chloride-vinyl chloride copolymer fiber and allowed to stand for 15 minutes. The amount of aqueous solution that had separated from the foam was measured. The foam stability was shown with the figure of the said foam volume. The higher the foam expansion or the lower the foam stability, the more satisfactory is the test product.

TEST RESULTS

The test results were set forth below in the Table VI.

Table VI

| Foaming properties Test system | Foam expansion | | | | | Foam stability | | | | |
|---|---|---|---|---|---|---|---|---|---|---|
| | Product A of this invention | Product B of this invention | Product C of this invention | Prior-art Product I (Control) | Prior-art Product II (Control) | Product A of this invention | Product B of this invention | Product C of this invention | Prior-art Product I (Control) | Prior-art Product II (Control) |
| Water | 300 | 310 | 325 | 305 | 310 | 20 | 15 | 10 | 41 | 40 |
| 30 % aqueous solution of sucrose | 360 | 375 | 385 | 360 | 360 | 25 | 20 | 15 | 46 | 45 |
| Aqueous solution of 30 % sucrose and 8 % edible oil | 250 | 260 | 270 | 245 | 250 | 17 | 14 | 10 | 25 | 25 |
| Aqueous solution of 40 % sucrose and 15 % wheat flour | 240 | 250 | 260 | 250 | 260 | 16 | 14 | 10 | 24 | 25 |

Note: Figures in the table are in milliliters.

As will be seen from Table VI, the products A, B and C of this invention were considerably superior to the prior-art products I and II in the foam stability.

It was also found that compared with product A of this invention, products B and C of this invention were considerably superior in the quality of foam.

The results of a comparative test for foaming property by the same procedure as that of the test (I) hereinbefore showed that whereas the volumes of foams derived from products A, B and C of this invention were substantially comparable to those of the prior-art products I and II, the foams derived from the products A, B and C of this invention were especially delicate and creamy to the touch, being considerably superior to the prior-art products I and II in the foam stability. Furthermore, it was found that products B and C of this invention were considerably superior to product A of this invention in quality.

EXAMPLE 2

90 kg. of lukewarm water (about 40° C) was added to 10 kg. of defatted soybean flour and, after stirring to homogeniety, the mixture was adjusted to pH about 2 with concentrated hydrochloric acid, the temperature of the mixture being brought to about 55° C. To this mixture was added a solution of 18 g. of pepsin (protease activity: 100,000 units/g.) in a small quantity of water and while the system was gently stirred at the above internal temperature for 1 hour. By this enzymatic hydrolysis was obtained an enzymatically hydrolyzed product which showed an analytical value of 0.52. This slurry was heated to an internal temperature of 90° C, at which level it was maintained for 5 minutes, followed by cooling to room temperature. The cooled slurry was centrifuged to obtain a supernatant fluid. This supernatent fluid was adjusted pH 5.5 by the gradual addition of aqueous sodium hydroxide (30% concentration) with stirring and, then, the fluid was heated to an internal temperature of 90° C, maintained at the same temperature for 15 minutes and cooled to 50° C. The insolubles were then removed by centrifugation. The resulting supernatant fluid was concentrated at an internal temperature of 60° C under reduced pressure to obtain a concentrate with a solid content of about 20%. This concentrate was spray-dried to recover 6.1 kg. of a soybean product as a white powder (hereinafter referred to as "product D of this invention").

On the product D of this invention, the foam expansion and foam stability were measured by the same procedure as that of the test for foaming property (II) described at page 28 of this specification. The results were set forth below in the table VII.

Table VII

| Test system | Foaming Properties | |
|---|---|---|
| | Foam expansion | Foam stability |
| Water | 325 | 11 |
| 30 % aqueous solution of sucrose | 385 | 14 |
| Aqueous solution of 30 % sucrose and 8 % edible oil | 265 | 10 |
| Aqueous solution of 40 % sucrose and 15 % wheat flour | 265 | 10 |

EXAMPLE 3

To 10 kg. of defatted soybean flour was added 90 kg. of lukewarm water (about 40° C) and, after stirring to homogeniety, the mixture was adjusted to pH 2.5 with concentrated hydrochloric acid. Separately, 40 g. of an acid protease with a protease activity of 50,000 units/g., obtained by the cultivation of trametes sanguinea (L. er Fr.) Lloyd and subsequent purification of the culture (cf. U.S. Pat. No. 3,097,145), was dissolved in a small amount of water. This solution was added to the above mixture and the enzymatic hydrolysis was carried out for 10 hours, with gentle stirring and while the above internal temperature was maintained. The procedure yielded an enzymatically hydrolyzed product with an analytical value of 0.55.

This hydrolyzed product was heated to an internal temperature of 90° C and maintained at the same temperature for 3 minutes, followed by cooling to room temperature. The cooled slurry was adjusted to pH 5.5 by the gradual addition of aqueous sodium hydroxide (30% concentration) with constant stirring. The slurry was allowed to stand for a while, after which it was centrifuged to remove the insolubles. 73 kg. of the resulting supernatant fluid was concentrated at an internal temperature of 60° C under reduced pressure to obtain 30 kg. of a concentrate with a solids content of about 20%. The concentrate was spray-dried to recover 6 kg. of a soybean product (hereinafter referred to as "product A' of this invention") as a white powder with a moisture content of 6.5%.

A conditioned preparation of pH 5.5, which was obtained by subjecting soybean to the same enzymatic hydrolysis, heating, cooling, pH adjustment, etc. as above, was centrifuged (first separation) to obtain 73 kg. of a supernatant fluid (pH 5.5). This supernatant fluid was heated once to 90° C and maintained at this temperature for 10 minutes. After cooling to 50° C, the insolubles were removed by centrifugation (second separation). Using a vacuum concentrator, the supernatant fluid was concentrated at an internal temperature of 60° C to obtain 30 kg. of a concentrate with a solids content of about 20%. The concentrate was spray-dried to recover 5.9 kg. of a soybean product (hereinafter referred to as "product B' of this invention") as a white powder with a moisture content of 6.3%.

An enzymatically hydrolyzed product of pH 2.5, obtained in the same manner as above, was heated, cooled and centrifuged (first separation) to obtain 73 kg. of a supernatant fluid (pH 2.5). This supernatent fluid was adjusted to pH 5.5 by the gradual addition of aqueous sodium hydroxide (30% concentration) with stirring. It was then heated again to 90° C and maintained at this temperature for 10 minutes, after which is was cooled to 50° C. The insolubles were removed by centrifugation (second separation) and the resulting supernatant fluid was concentrated at an internal temperature of 60° C with a vacuum concentrator to obtain 30 kg. of a concentrate with a solids content of about 20%. This concentrate was spray-dried to recover 5.8 kg. of a soybean product (hereinafter referred to as "product C', of this invention") as a white powder with a moisture content of 6.4%.

The products A', B' and C' of this invention invariably contain about 30 weight percent of soluble nitrogen-free matter which is a principal constituent of soybean whey and have an excellent flavor and considerably improved foaming property. It has also been found that, in quality, products B' and C' of this invention are substantially superior to product A' of this condition.

REFERENCE EXAMPLE 2

12 g. of the proucts A, B or C or the product D of this invention blended well in dry condition with 150 g. of low-gluten wheat flour and 200 g. of white sugar. To the dry mixture were added 140 ml. of water, 100 g. of egg and a small amount of vanilla essence. After thorough whipping with a beater, the mixture was poured in cake molds and baked in an oven at 160° C for 50 minutes to produce sponge cakes. These sponge cakes have an excellent flavor and a good taste.

The dough texture also was excellent.

REFERENCE EXAMPLE 3

In 400 ml. of water was put 6 g. of agar and, after causing the agar to absorb water for a while, the system was heated to dissolve the agar. To this solution was added 300 g. of sucrose and the mixture was heated to a homogenious slurry.

Separately, 5 g. of the product A, B, C or D of this invention was dissolved in 45 ml. of wter and the solution was whipped well in a bowl. To this was gradually added the above agar-sugar solution, followed by vigorous whipping. Then, the whipped slurry was heated and stirred well again. After it had cooled somewhat, the slurry was poured into a mold and cooled. The above procedure yielded a foamed agar-soybean jam with delicious taste.

REFERENCE EXAMPLE 4

Four grams of the product A', B' or C' of this invention and 30 g. of gelatin were mixed with 200 ml. of water and the mixture was heated to obtain a homogenious gelatin solution. Separately, 450 g. of sucrose, 250 g. of millet jelly and 150 ml. of water were heated to complete dissolution and the solution was further heated to evaporate the water. The concentrate was poured into the previously prepared gelatin solution with stirring and, upon completion of the addition, the mixture was sufficiently whipped by vigorous stirring. The foamed slurry was poured into a mold of starch and cooled to gel. The procedure yielded a delicious quality marshmallow.

We claim:
1. A method for preparing soybean products having good foaming properties, which comprises:
   1. subjecting soybean materials selected from the group of whole soybean, decoated soybean, ground soybean, soybean flakes, coarsely ground soybean and defatted soybean in powdery or flake form containing both whey component and protein to enzymatic hydrolysis, without removing the whey component, until a partially hydrolyzed product, of which the analytical value at 660 m$\mu$ showing degree of hydrolysis coming within the range of 0.4 to 0.7, is obtained;
   2. heating the partially hydrolyzed product at about 90° C for 1–10 minutes, cooling to a temperature no greater than 60° C, the pH of the partially hydrolyzed product being brought to a value from 5 to 7 before or after said heating or cooling step;
   3. removing precipitates formed; and
   4. concentrating and/or drying the resultant solution.

2. A method according to claim 1, wherein step (2) comprises:
   a. heating the partially hydrolyzed product at about 90° C for 1–10 minutes;
   b. cooling to a temperature no greater than 60° C;
   c. removing insolubles;
   d. heating the resultant solution at not lower than 70° C for no longer than 30 minutes;
   e. cooling to a temperature no greater than 60° C; and
   f. adjusting the pH of the partially hydrolyzed product to a value from 5 to 7 before or after said heating or cooling step.

3. A method according to claim 1, wherein the concentration in step (4) is conducted under reduced pressure at a temperature below 70° C.

4. A method according to claim 1, wherein the enzymatic hydrolysis is carried out by using pepsin.

5. A soybean product having good foaming properties, consisting predominantly of crude protein and soluble nitrogen-free substance which is mostly comprised of carbohydrates, the said crude protein being about 1.5 times as much as the soluble nitrogen-free substance by weight basis produced in accordance with the process of claim 1.

* * * * *